D. D. DARLING, L. L. PARSHALL & F. H. WENDELL.
Feed-Steamer.

No. 202,706. Patented April 23, 1878.

WITNESSES:

INVENTOR:
D. D. Darling
L. L. Parshall
BY F. H. Wendell

ATTORNEYS.

UNITED STATES PATENT OFFICE.

DANIEL D. DARLING, LEROY L. PARSHALL, AND FRED H. WENDELL, OF COLDWATER, MICHIGAN.

IMPROVEMENT IN FEED-STEAMERS.

Specification forming part of Letters Patent No. 202,706, dated April 23, 1878; application filed March 2, 1878.

*To all whom it may concern:*

Figure 1:
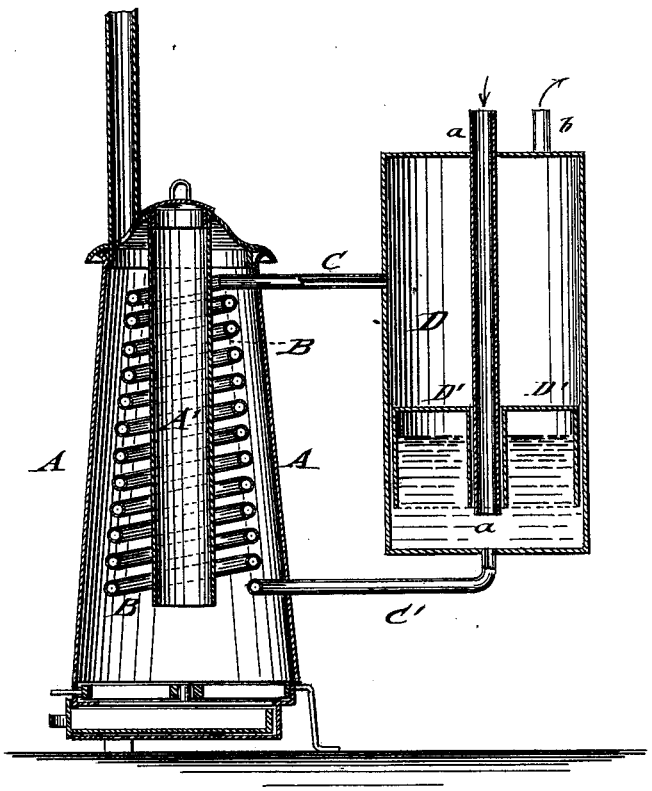
Figure 2:
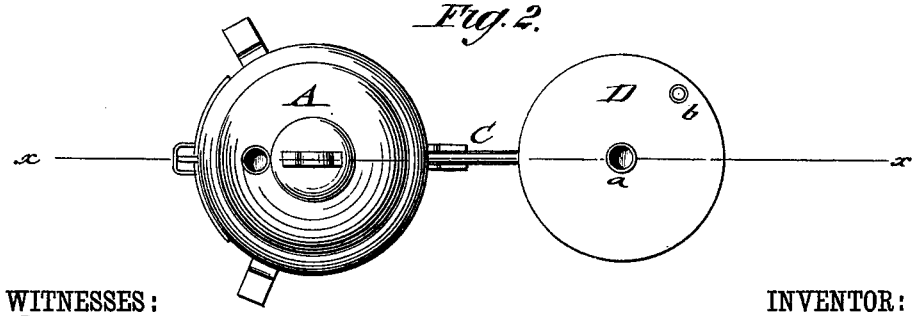

Be it known that we, DANIEL D. DARLING, LEROY L. PARSHALL, and FRED. H. WENDELL, of Coldwater, in the county of Branch and State of Michigan, have invented a new and Improved Feed-Steamer, of which the following is a specification:

In the accompanying drawing, Figure 1 represents a vertical longitudinal section on line $x$ $x$, Fig. 2, of our improved feed-steamer; and Fig. 2 is a top view of the same.

Similar letters of reference indicate corresponding parts.

This invention is intended to furnish for agricultural purposes in general, and more especially for cooking or steaming food for man or beast, an improved steam apparatus, in which the steam is generated with a small consumption of fuel, and dry steam furnished that may be employed for heating, cooking, drying, cleansing, and other purposes.

The invention consists of a furnace with central tube and coil of pipe, that is connected by a bottom and top pipe with a water receptacle or tank having a central downward-extending pipe for supplying water, a float, and an exit-pipe for the steam.

Referring to the drawing, A represents a furnace, with a grate and ash-pit at the bottom and a smoke-pipe at the top. The casing of the furnace is preferably made of conical shape, and provided with a detachable cover and a center tube, A', extending down to the fire, the same being open at the lower end, and closed at the top by a removable lid. A coil of pipe, B, is supported at the interior of the furnace-casing, and made to wind, with gradually-diminishing convolutions, around the center tube, so as to be exposed in a more perfect manner to the action of the heat of the fire, the tube A' serving to increase the effect of the fire.

The coil B is connected, by top and bottom pipes C C' and couplings, respectively, with the middle part and bottom of a tank, D, that is filled with water through a pipe, $a$, extending from the top of the tank down to near the bottom of the tank, for the purpose of filling the same with water without interference by the steam collected at the upper part of the tank. This admits the filling of the tank without stopping the steam while in use, the water passing then at once into the coil of pipe, and being heated without coming in contact with the steam in the tank.

A float, D', is arranged in the tank D, and guided by a central sleeve along the water-pipe of the same. It serves the purpose of generating drier steam, which consequently produces the more rapid heating of the water in the vats or vessels in which and over which the feed is cooked, heated, or steamed.

The dry steam obtained by the float produces less condensation in the pipes in connecting the tank with the objects to be dried, heated, or cooked, and accomplishes a more perfect and thorough work in a given time with a stated amount of fuel.

As the heat acts directly on every part of the coil in the furnace, the water therein is heated rapidly, and the steam generated and conducted to the upper part of the tank or reservoir, and thence by the steam-conducting pipe or pipes $b$ to the different purposes for which the same is required.

A continuous supply of water is furnished to the coil from the tank, and the water therein is replenished from time to time through the central water-pipe, so that a continuous working of the steam apparatus can be kept up, and an economical and effective heating and cooking apparatus for various agricultural and other applications be obtained.

Having thus described our invention, we claim as new and desire to secure by Letters Patent—

The combination of the furnace A, having pendent tube A', the tank D, having float and water-supply pipe below it, and the coiled pipe B, connecting by pipes C C' with the tank, as shown and described, for the purpose specified.

DANIEL D. DARLING.
LEROY L. PARSHALL.
FRED H. WENDELL.

Witnesses:
C. G. BURLINGER,
A. T. LANPHERE.